UNITED STATES PATENT OFFICE.

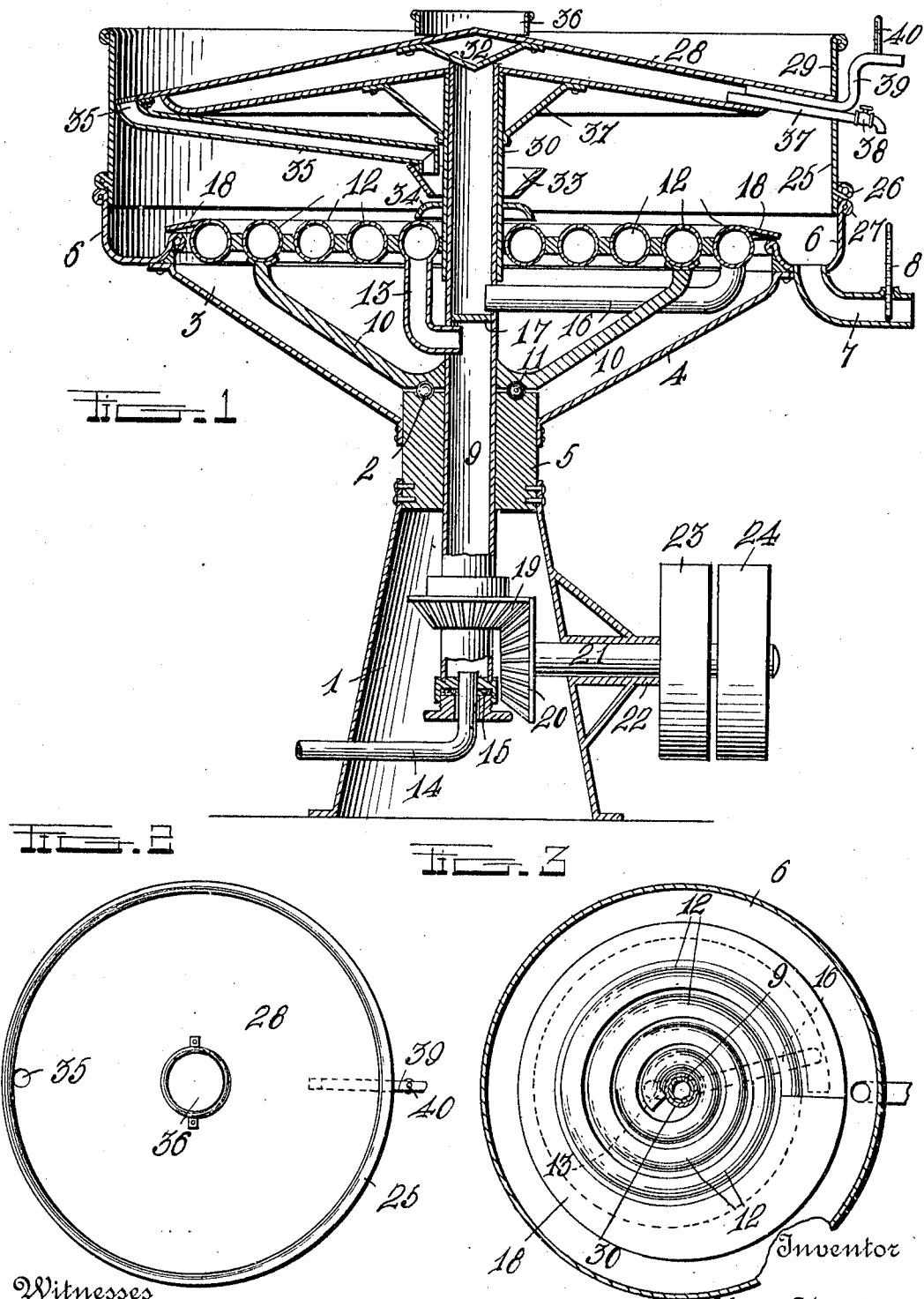

HANS CHRISTENSEN, OF FORT ATKINSON, WISCONSIN, ASSIGNOR OF ONE-HALF TO CHARLES PALM, OF FORT ATKINSON, WISCONSIN.

PASTEURIZER.

957,035.  Specification of Letters Patent.  Patented May 3, 1910.

Application filed January 3, 1910. Serial No. 535,913.

*To all whom it may concern:*

Be it known that I, HANS CHRISTENSEN, a citizen of the United States, residing at Fort Atkinson, in the county of Jefferson and State of Wisconsin, have invented certain new and useful Improvements in Pasteurizers; and I do declare the following to be a full, clear, and exact description of the invention, such as will enable others skilled in the art to which it appertains to make and use the same.

This invention relates to improvements in machines for pasteurizing or sterilizing liquids.

One object of the invention is to provide an improved device of this character whereby the pasteurization of milk or other liquids will be greatly simplified and more thoroughly accomplished.

Another object is to provide a pasteurizer or sterilizer the parts of which may be readily separated for cleaning or other purposes.

With the foregoing and other objects in view, the invention consists of certain novel features of construction, combination and arrangement of parts as will be more fully described and particularly pointed out in the appended claims.

In the accompanying drawings, Figure 1 is a central vertical sectional view of a pasteurizer constructed in accordance with the invention; Fig. 2 is a top plan view of the same; Fig. 3 is a similar view of the lower portion of the machine with the cover removed and showing the arrangement of the heating coil therein.

In the embodiment of the invention, I provide a hollow supporting base 1 having on its upper end a ball bearing 2. Arranged on the upper end of the base is a circular bowl or basin 3 having an inclined bottom 4. The base 1 and bowl 3 are preferably formed of boiler iron, while the bearing 2 is formed in the upper end of a tubular cast metal bearing block 5 secured to the upper portion of the base as shown. Secured to the outer side of the upper portion of the bowl 3 is a circular milk receiving trough 6 into which the sterilized or pasteurized milk is discharged and from which said milk passes through an outlet or discharge tube 7 to a suitable receptacle provided to receive the same. In the discharge tube 7 is preferably arranged a thermometer 8, whereby the temperature if the milk passing from the trough 6 is ascertained.

Revolubly mounted in the bearing block 5 is a tubular shaft 9 which projects upwardly through and above the bowl 3 and to said shaft is secured a supporting spider 10, in the center or base portion of which is formed a ball race 11, which is engaged with a ball bearing 2 on the bearing block 5, as shown. On the arms of the spider is secured a liquid heating coil 12, which is formed from a continuous spirally coiled tube, the inner end of which is connected by a steam conducting pipe 13 with the lower portion of the tubular shaft 9 which also serves as a steam conducting tube and which is connected at its lower end to a steam inlet tube 14, said tube 14 entering the tube 9 through a packed joint or stuffing box 15, whereby said tubular shaft 9 is permitted to revolve on the end of the steam inlet tube. The outer end of the coil 12 is connected to the upper portion of the tubular shaft 9 by a steam discharge pipe 16 which enters the shaft above the pipe 13. The shaft 9 is divided between the ends of the pipes 13 and 16 by a transverse partition 17, whereby the inlet end of the shaft is separated from the discharge end. The coils of the heating coil are spaced apart and the spaces between the coils filled by the soldering material 12', the purpose of which will hereinafter appear.

The outer edge of the plate formed by the coil 12 is disposed adjacent to the sides of the upper portion of the bowl 3 and to the outer coil of the plate is secured an annular flange 18 which projects over the adjacent upper edge of the bowl 3 and serves to direct the milk or other liquid from the coil into the trough 6. Fixedly mounted on the lower portion of the tubular shaft 9 in the hollow base 1 is a beveled gear 19 which is engaged with a similar gear 20 on a drive shaft 21 mounted in suitable bearings 22 in one side of the base as shown. On the outer end of the shaft 21 are mounted fast and loose pulleys 23 and 24, whereby the shaft 9 and coil are rapidly revolved by any suitable power connected with the pulleys by a belt not shown.

Over the bowl 3 and coil 12 and removably engaged with and supported by the outer wall of the trough 6 is a combined liquid distributing and heating cover section, comprising an annular rim 25, the lower edge of which fits into the upper portion of the trough 6 upon which it is supported by means of an annular bead 26 secured to the outer side of the rim and engaging a similar bead 27 formed on the upper edge of the trough as shown. In the upper portion of the rim 25 is arranged a circular steam and water chamber 28, which inclines or tapers downwardly from its center toward its outer edges where it is secured to the inner side of the rim 25. The rim 25 projects above the lower edge of the chamber 28 and forms an annular flange 29, the purpose of which will hereinafter appear. Secured to the inner wall of the chamber 28 is a centrally disposed guide tube 30, which is preferably braced by an annular boss 31 and which is adapted to loosely engage the upper or discharge end of the tubular shaft 9 as shown. The upper end of the shaft 9 projects a slight distance above the upper end of the guide tube 30 and into the steam chamber 28 and in said chamber above the upper open end of the shaft 9 is arranged a conical steam deflector 32 which deflects the steam from the upper end of the shaft in one direction through the chamber 28.

Secured to the guide tube 30 above the coil 12 is a milk receiving funnel 33 which is open at its lower end around the tube 30 and secured to said tube immediately below the open end of the funnel is an annular radially projecting downwardly curved deflecting flange 34, upon which the milk or other liquid from the funnel is discharged and by which said liquid is directed onto the heating coil. Connected with the upper end of the funnel 33 is a milk conducting tube 35, the upper outer end of which communicates with the upper side of the chamber 28 adjacent to the flange 29 whereby the milk or liquid flowing down over the upper side of the chamber 28 is conducted through said tube 35 to the funnel 33. Secured to the chamber 28 over the center of the same is a milk receptacle 36, the lower edge of which is spaced a suitable distance above the upper side of the chamber 28 to provide a discharge passage through which the milk placed in the receptacle flows out in all directions over the inclined upper side of the steam chamber where said milk or other liquid is promptly heated and after which said milk passes through the tube 35 to the funnel 33 and from thence is directed onto the rapidly revolving heating and aerating coil 12 on which, owing to the centrifugal motion imparted thereto by the rapidly revolving movement of the coil, said milk is thrown outwardly toward the outer edges of the coil and spread over the latter in a thin sheet which gradually decreases in thickness toward the outer edge of the coil, and from which the thin sheet of milk is finally thrown off over the deflecting flange 18 and into the trough 6 from which it passes in a pasteurized or sterilized state through the discharge tube 7. By thus spreading the milk or other liquid out into a thin sheet, the same is thoroughly heated by contact with the steam heated coil 12 and thoroughly aerated before being discharged into the trough 6. Connected to the steam chamber 28 and passing through the rim 25 is a drain pipe 37 having on its outer end a drain cock 38. Also connected with the steam chamber 28 is a condensed steam or water discharge pipe 39 to which the water of condensation is forced from the steam chamber. The pipe 39 is preferably provided with a thermometer 40, whereby the temperature of the steam and water passing from the chamber 28 may be ascertained.

While the device has been herein described as being employed for sterilizing liquids by the application of heat, it is obvious that by employing cold water or other fluid in place of steam that the device may be employed and is well adapted for the purpose of rapidly cooling liquids which are passed therethrough as herein described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. A device of the character described comprising a supporting base, a revolubly mounted coil arranged above said base, an inclined steam chamber arranged over said coil, means to discharge the liquid onto said chamber, and means whereby the liquid is conducted from said chamber to said coil over which the liquid is passed in a thin sheet by the centrifugal action of the revolving coil.

2. A pasteurizer comprising a base, a tubular shaft revolubly mounted therein, a coil secured to said shaft and revolved thereby, means whereby steam is admitted to and passed through said coil, a steam chamber arranged above the coil, said chamber being inclined from its center toward its outer edges, means to conduct the steam from said coil to said chamber, a milk distributing receptacle arranged above said chamber and adapted to discharge milk on the upper surface thereof, a milk conducting tube connected with the upper surface of said heating chamber, and means whereby the milk or other liquid is discharged onto the coil from said conducting tube and is spread outwardly in a thin sheet over the coil by the centrifugal action thereof.

3. A pasteurizer comprising a hollow base, a tubular shaft revolubly mounted in said base, a driving mechanism connected with said shaft, a bowl arranged on the upper end of the base, a heating coil secured to and revolved by said shaft, a milk trough arranged around the upper edge of said bowl, a milk conducting flange secured to the coil and projecting over the adjacent edge of the trough, a steam chamber arranged above said coil and trough, said chamber being inclined from its center to its outer edges, a liquid retaining flange around the outer edge of said chamber, a milk receptacle arranged above the center of the chamber whereby milk is evenly distributed over the upper surface of the chamber, a milk conducting pipe connected with said upper surface, and means whereby the milk from said tube is evenly distributed onto said heating coil and is thrown across the same in a thin sheet by the centrifugal action of the coil and is discharged therefrom over said flange and into said trough.

4. A pasteurizer comprising a base, a hollow steam conducting shaft revolubly mounted in said base, a steam inlet pipe connected with the lower end of said shaft, means whereby the latter is driven, a bowl arranged on the upper end of said base, a heating coil connected to and revolved by said shaft, a steam conducting pipe to connect the inner end of said coil with the lower portion of said shaft whereby steam passes from the shaft to the coil, a steam discharge pipe to connect the outer end of the coil with the upper portion of said shaft, a trough secured to the upper end of said bowl, an annular rim adapted to be removably engaged with said trough, a steam chamber connected to said rim, said chamber being inclined from its center toward its outer edges, and connected on its under side with the upper discharge end of said tubular shaft whereby the steam discharged from said coil is conducted to said steam chamber, and a milk distributing receptacle arranged above the upper surface of said steam chamber.

5. A pasteurizer comprising a base, a hollow shaft revolubly mounted in said base, a supporting spider secured to said shaft and having a ball bearing engaging with the upper portion of said base, a spiral steam coil arranged on said spider, said coil being soldered together to form a solid plate, means whereby steam is conducted to said coil, a bowl secured to the upper end of said base, an annular milk trough secured to the upper end of the bowl and adapted to receive the milk passed over said coil, an annular rim removably engaged with and supported by said trough, a steam chamber secured to said rim, said chamber being inclined from its center toward its outer edges and communicating on its under side with the upper end of said tubular shaft, a steam deflector arranged in said chamber above the upper open end of the shaft, a guide tube secured to the under side of said chamber and adapted to be engaged with the upper end of the shaft, a funnel secured to said tube, an annular deflecting flange secured to the tube below the lower discharge end of said funnel whereby the milk therefrom is directed onto said coil, a milk distributing receptacle arranged above the upper surface of said steam chamber, a milk conducting tube to connect said upper surface of the chamber with said funnel, a milk retaining flange arranged around the outer edge of the upper surface of said steam chamber, a drain pipe and cock, and a condensed steam discharge pipe connected with said steam chamber.

In testimony whereof I have hereunto set my hand in presence of two subscribing witnesses.

HANS CHRISTENSEN.

Witnesses:
E. E. HAY,
GUSTAVE MICHELS.